(12) United States Patent
Bergenwall et al.

(10) Patent No.: US 7,330,902 B1
(45) Date of Patent: Feb. 12, 2008

(54) HEADER COMPRESSION

(75) Inventors: Martin Bergenwall, Espoo (FI); Patrik Flykt, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/030,749

(22) PCT Filed: May 8, 2000

(86) PCT No.: PCT/IB00/00706

§ 371 (c)(1),
(2), (4) Date: Apr. 29, 2002

(87) PCT Pub. No.: WO00/69139

PCT Pub. Date: Nov. 16, 2000

(30) Foreign Application Priority Data

May 10, 1999 (GB) .................................. 9910797.1
May 18, 1999 (GB) .................................. 9911550.3

(51) Int. Cl.
*G06F 15/16* (2006.01)
*H04J 3/24* (2006.01)
*H04L 12/28* (2006.01)
*H04L 12/56* (2006.01)
*H04B 7/185* (2006.01)

(52) U.S. Cl. .................. 709/232; 370/465; 370/477

(58) Field of Classification Search ............... 709/230, 709/232, 200, 228; 370/471, 389, 474, 392, 370/465, 477; 455/67.13

See application file for complete search history.

(56) References Cited

U.S. PATENT DOCUMENTS

| 5,546,395 | A | * | 8/1996 | Sharma et al. ............... 370/468 |
| 5,742,734 | A | * | 4/1998 | DeJaco et al. ............... 704/226 |
| 6,122,293 | A | * | 9/2000 | Frodigh et al. ............... 370/473 |
| 6,300,887 | B1 | * | 10/2001 | Le ............... 341/60 |
| 6,397,177 | B1 | * | 5/2002 | Isabelle ............... 704/221 |
| 6,477,669 | B1 | * | 11/2002 | Agarwal et al. ............... 714/708 |
| 6,535,925 | B1 | * | 3/2003 | Svanbro et al. ............... 709/247 |
| 6,556,587 | B1 | * | 4/2003 | Svanbro et al. ............... 370/471 |

(Continued)

FOREIGN PATENT DOCUMENTS

EP        0616455        9/1994

(Continued)

OTHER PUBLICATIONS

S. Casner and V. Jacobson. "Compressing IP/UDP/RTP Headers for Low-Speed Serial Links". Feb. 1999.*

(Continued)

*Primary Examiner*—Glenton B. Burgess
*Assistant Examiner*—Philip J. Chea

(57) ABSTRACT

A method for communicating a message over a data path by means of data transfer apparatus capable of transmitting the data over the data path, generating a representation of the data as received from the data path and generating an indication of the communication quality of the data path; the method comprising: forming a plurality of individual data segments together representing the message, the format of each data segment being selected from one of a plurality of available segment formats in dependence on the quality of the data path; transferring the segments over the data path by means of the data transfer apparatus; and combining the segments as received from the data transfer apparatus to form a representation of the message.

20 Claims, 2 Drawing Sheets

U.S. PATENT DOCUMENTS 6,700,888 B1 *   3/2004   Jonsson et al. ............. 370/392
6,745,012 B1 *   6/2004   Ton et al. ................ 455/67.13
6,754,231 B1 *   6/2004   Jonsson et al. ............. 370/474
6,967,930 B2 *   11/2005  Burmeister et al. ......... 370/253

FOREIGN PATENT DOCUMENTS

WO      9621984         7/1996
WO      WO 00/51307   *  8/2000

OTHER PUBLICATIONS

"Low-Loss TCP/IP header compression for wireless networks" by Degermark, et al, vol. 3, No. 5, Oct. 1, 1997 (pp. 375-387) ISSN: 1022-0038, Wireless Networks.

* cited by examiner

HEADER COMPRESSION

TECHNICAL FIELD

This invention relates to the communication of data, and particularly to a method for communicating data in which the format of the data—for example the level of header compression—is dependant on the quality of the communications link.

BACKGROUND OF THE INVENTION

A variety of protocols are available for the communication of a data message over a communications link. In numerous protocols the message is divided into packets at the transmitter end; the packets are conveyed individually over the communications link; and at the receiver end the packets are combined to re-form the message. Each packet normally comprises a payload, which represents the portion of the message that the packet carries, and control data, which are used in the communication procedure itself. The control data are normally in a contiguous block at the beginning of the packet (a header) but could be at the end of the packet (a trailer) or distributed through it. The functions of the control data can include:
1. indicating the source address of the packet,
2. indicating the destination address of the packet,
3. indicating the location of the payload's data in the message, and
4. providing error check or error correction information for the header, the packet or the message.

One example of a packet protocol is TCP/IP (transmission control protocol/internet protocol). In basic TCP/IP the transmitting unit gives each packet a 40 byte header which contains information for all the functions 1 to 4 above. As the packet passes over the communication link the destination address of the packet is used to route the packet to the receiving unit. At the receiving unit the error check information is used to check that the packet has been received intact; if an error is detected then the transmitting unit is requested to retransmit the packet. Then the receiving unit extracts the payload from each packet and combines the payloads in the order indicated by the location information in their respective headers, to re-form the message.

The basic 40 byte header represents a significant proportion of the bandwidth used for the transmission. To address this high overhead a mechanism [RFCs 1144, 2507, 2508, 2509] for compression of TCP/IP headers has been developed. Using this mechanism the TCP/IP header can be compressed from 40 to a minimum of 4 bytes. TCP/IP header compression [RFC1144] is today widely used in combination with PPP (point-to-point protocol) for dial-up links over modem and other low speed connections.

The header compression mechanism is based on the fact that most of the fields in the TCP and IP headers are constant or change very little during the transmission of a message. For example, the source address and destination address are the same for all the packets of the message. To exploit this the header compression mechanism operates by transmitting the whole header only once, in the first packet of the message, and after that only the parts that have changed. The compression mechanism can be enhanced by not transmitting changes in the header that are obvious for both transmitter and receiver. Similar mechanisms have been proposed for UDP/IP and RTP/UDP/IP.

EP 0 616 455 describes a computer network where messages are sent over the links between the computers in compressed, segmented form, the site of the segments being appropriate to the transmission characteristics of the link.

WO 96/21984 describes a packet radio system which encapsulates data packets of external packet data networks by PPP and passes them through one or more sub-networks to a point which supports the protocol of the encapsulated data packet. A PPP packet is compressed before the encapsulation of a special radio link protocol by removing therefrom the unnecessary control fields.

The TCP/IP header compression mechanism is an effective way to improve bandwidth efficiency for many point to point links, when the link is reliable and there are no errors. However, if the compressed headers are distorted due to errors in the transmission link then significant problems can arise. Because the compression mechanism operates by transmitting only the changes from one header to the next, if one header is received wrongly then that error propagates and affects the receiver's interpretation of succeeding compressed headers, destroying the integrity of those headers' packets. This means that those packets must to be retransmitted. On a link in which there is a high BER (bit error rate), such as many cellular radio links, the bandwidth used to retransmit packets that have been wrongly received due to header compression can be greater than the bandwidth saved by sending the compressed headers.

There is provision for a gradual increase in the level of TCP/IP header compression on a link over time. Full headers are sent periodically, and the interval between the sending of a full header increases exponentially to an upper limit. (The upper limit exists so that the connection will eventually overcome even an undetected bit error in a compressed header). If an error is detected, using the received data at the TCP/IP protocol level, then the interval is reset to the minimum and then begins to increase again.

Some high BER links run an error-checking retransmission protocol under the TCP/IP protocol to ensure that the TCP/IP protocol receives data intact and free from bit errors. However, the presence of an underlying retransmission protocol cannot be guaranteed—for example, in the proposed standard for the transmission of packet data over third-generation (UMTS) cellular systems the use of a layer 2 retransmission protocol is still uncertain.

There is therefore a need for an improved method of header compression.

SUMMARY OF THE INVENTION

According to one aspect of the present invention there is provided a method for communicating a message over a data path, the method comprising: forming a plurality of individual data segments together representing the message, each data segment having control data; transferring the data segments over the data path; characterised in that the quality of the data path is estimated such that the format of each data segment being selected from one of a plurality of available segment formats in dependence on the quality of the data path and wherein the available segment formats differ in the amount of control data that they include.

Preferably the amount of control data is for example error check and/or correction data and/or data for other control purposes as set out above. There may be two or more available segment formats. The segment formats may be of different lengths, or may all be the same length (in which case some of the segment formats preferably include more data representing at least part of the message than do others). The control data may permit the detection and/or correction of errors in a segment as received.

The method preferably comprises selecting one or more segment formats that include a greater amount of control data increasingly preferentially when the estimated quality decreases, and preferably vice versa. It is preferred that when the estimated quality decreases, a greater amount of error check and/or correction data is sent in comparison to the amount of message data that is sent, and preferably vice versa. The available segment formats suitably include a first format including a first amount of control data and a second format including a second amount of control data, the second amount being less than the first amount. The method may then comprise selecting the first format with increasing frequency when the indicated quality of the link decreases, and preferably vice versa.

The data segments may be packets or other datagrams. The control data may suitably be comprised in a header and/or trailer of each packet. The said first format may be a format having a non-compressed header whilst the second format may be format having a compressed header.

The method comprises estimating the quality of the data path. The quality of the data path is preferably represented by the quality of communications over the path, or over another path that may be assumed to have similar quality characteristics to the path—for example a path sharing a communications link with the path but in the opposite direction or on a different channel. The quality of communications over the path may be represented by the quality of communications over a part of the path, preferably an error-prone part of the path such as a radio link.

The quality of the data path or a representative path may be estimated by any suitable measure, or by more than one measure. The quality of the data path or a representative path may be estimated by means of one or more of the following measures: signal to interference ratio, bit error rate, power loss over the path, required transmission power over the path, delay over the path. The quality of the data path may be estimated periodically. The quality of the data path is preferably estimated periodically so as to update the estimate of quality one or more times during the step of forming the plurality of individual data segments together representing the message The path may include a portion over which no bit error correction protocol is applied, e.g. a radio link over which there is no layer 2 protocol. The path may include a portion constituted by a radio link, e.g. a satellite or cellular telephony link.

The data segments may be formed and/or transferred according to one or more of the following protocols: TCP, IP, UDP, RTP.

Each packet preferably includes message data representing at least part of the message. Each of the available segment formats may have the same capacity to carry message data.

The control data of each segment may include first control data (e.g. header data) for permitting detection and/or correction of errors in message data of the segment and/or for permitting control over the transmission and/or reception of the segment and second control data (e.g. header error check data) for permitting detection and/or correction of errors in the first control data. Preferably any available segment formats including greater amounts of first control data include greater amounts of second control data.

According to a second aspect of the present invention there is provided a communication system for communicating a message over a data path, comprising: data forming apparatus for forming a plurality of individual data segments together representing the message, each data segment having control data; data transfer apparatus capable of transmitting the data segments over the data path; characterised in having: path quality estimation apparatus for estimating the quality of the path and in the data forming apparatus the format of each data segment being selected from one of a plurality of available segment formats in dependence on the quality of the data path wherein the available segment formats differ in the amount of control data that they include.

BRIEF DESCRIPTION OF THE DRAWINGS

The present invention will now be described by way of example, with reference to the accompanying drawings, in which.

BEST MODE FOR CARRYING OUT THE INVENTION

Figure 1:
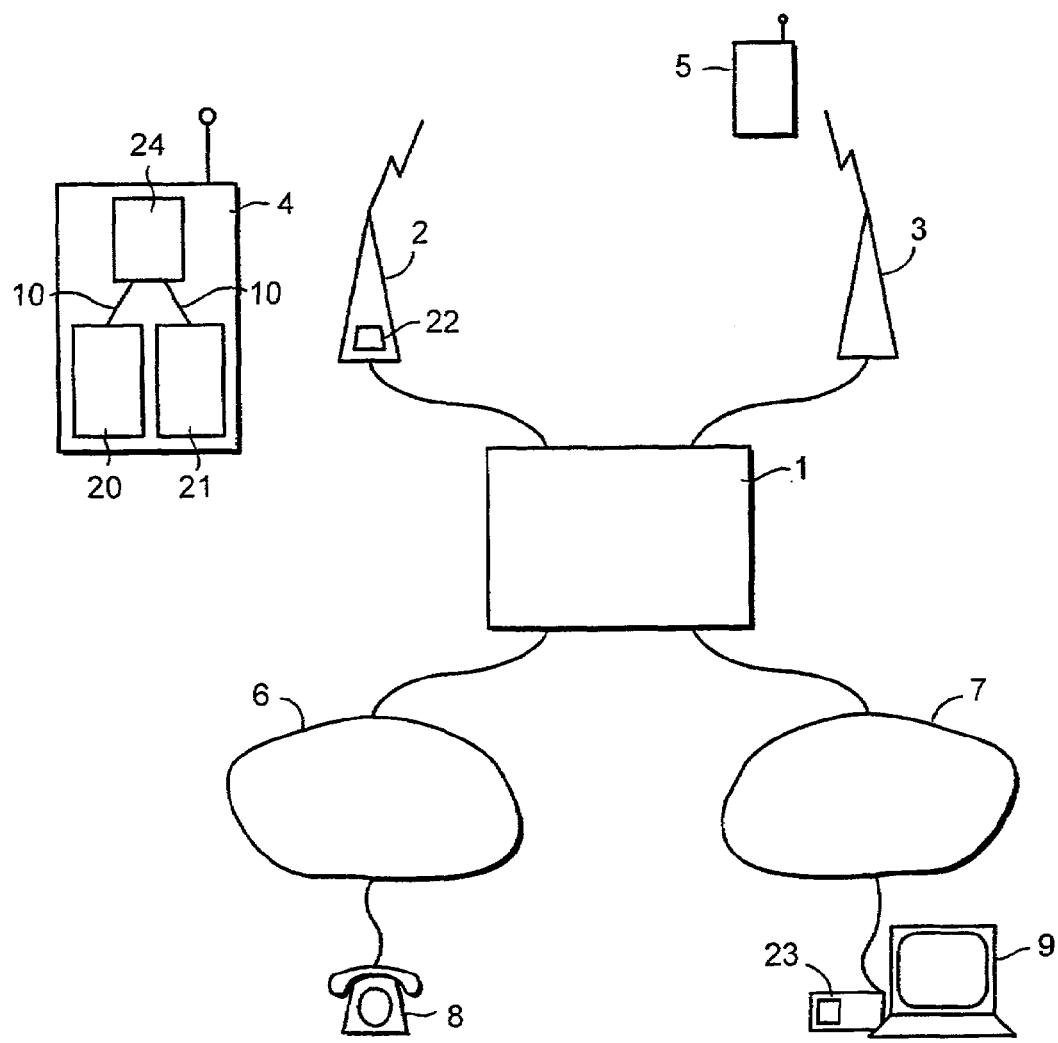
FIG. 1 shows a schematic diagram of a telecommunications system.

The telecommunications system of FIG. 1 comprises a cellular telephone system that is controlled by control apparatus indicated as 1. The control apparatus controls radio base stations 2, 3 which are capable of communicating with handset terminals 4, 5 by radio.

The control apparatus is linked to a public switched telephone network (PSTN) 6 and to packet-based networks 7 such as the internet. Terminals 8, 9 are linked directly to the networks 6, 7 respectively. Users of any of the terminals may communicate with the users of any of the other terminals by establishing a connection across the intervening equipment.

Figure 2:
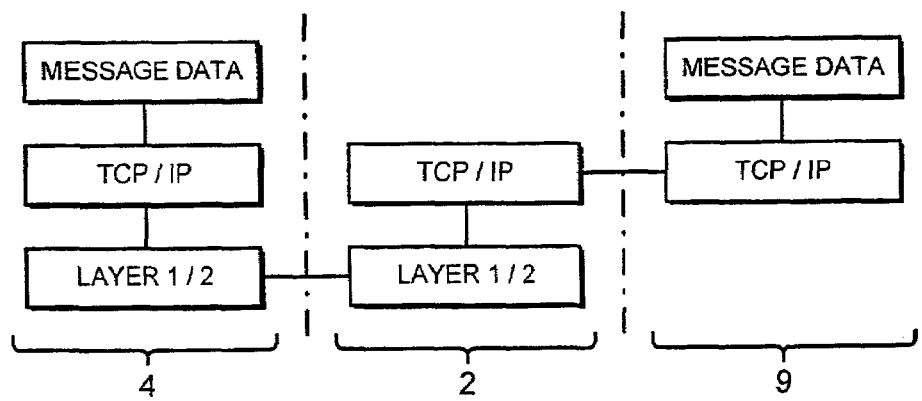
FIG. 2 shows a simplified protocol stack for transmission of data in the system of FIG. 1.

FIG. 2 shows a simplified protocol stack for a data connection between terminal 4 and terminal 9 via base station 2. The data connection illustrated by FIG. 2 is the transmission of a message of data stored at the terminal 4—for example a text message or data representing a photograph. To support this connection the TCP/IP protocol is run between the terminal 4 and the terminal 9; and below the TCP/IP protocol a layer 1 protocol is run between the terminal 4 and the base station 2. Accordingly, FIG. 1 shows that the terminal 4 includes TCP/IP processing apparatus 20 and layer 1 processing apparatus 21, the base station 2 includes layer 1 processing apparatus 22 and the terminal 9 includes TCP/IP processing apparatus 23. The apparatus 20 and 21 could be embodied in a single DSP (digital signal processor). Any of the apparatus 20-23 could be embodied by dedicated hardware or constituted by software running on multi-purpose hardware. Layer 1 information may be exchanged between the terminal 4 and the base station 2 over more than one radio channel—for example, traffic information may be sent over a traffic channel and control information over a control channel.

In this example system the layer 1 protocol governs the operation of the air interface between the terminal 4 and the base station 2. At the transmitter end the layer 1 protocol transforms the TCP/IP data (or any other form of data) processed by layer 2 into layer 1 data for transmission over the air interface. The processing may, for instance, involve breaking the TCP/IP packets down into chunks of a suitable size to be sent in frames of a standard size over the air interface. At the receiver end the layer 2 protocol reassembles the TCP/IP packets (or other data) to form the layer 2 output. If the link between transmitter and receiver were perfect then the layer 1 output would be a perfect copy of the input to layer 1 from the TCP/IP layer processed by layer 2 at the transmitter end. However, bit errors can arise over the air interface, and a layer 1 protocol does not generally perform error checking, so the layer 1 output may differ from the layer 1 input. In addition to its function of transmitting the message data, the layer 2 protocol exchanges layer 2 control data between the units at its ends. This data is used to take care of air interface issues such as power control and handover from one base station to another. In many systems the apparatus executing the layer 1 protocol generates or controls the generation of and generally has access to information on a number of factors that are indicative of the quality of the link between its ends, such as signal to interference ratio (SIR), the power with which one of the end radio units of the link receives the other, the attenuation over the link and the delay over the link, each in one or both of the directions over the link. This information may be collected at both ends of the link and exchanged between the ends of the link, so, for example, the terminal 4 maybe made aware by the base station 2 of the quality measured by the base station of received signals on the downlink from the terminal to the base station and vice versa.

The message data that is to be transmitted from the terminal 4 could be generated in any available way, for instance it could be a text file (encoded e.g. according to the ASCII format) or data representing a picture (encoded e.g. according to a JPEG format), a video (encoded e.g. according to an MPEG format) or speech (encoded e.g. according to the H.323 format for voice over IP).

In summary, the process for transmitting message data at 20 in terminal 4 to the terminal 9 is as follows:
1. the message data is identified or formed at the terminal 4;
2. the message data is transformed according to the TCP/IP protocol to form TCP/IP data;
3. the TCP/IP data is transformed according to the level 1 protocol to form level 1 data;
4. the level 1 data is communicated by radio to the base station 2 according to the level 1 protocol (bit errors may be introduced in this step);
5. the received 1 data is transformed at the base station 2 to recover a representation of the TCP/IP data at the terminal 4;
6. the representative TCP/IP data is communicated over the network 7 to the terminal 9 according to the TCP/IP protocol;
7. the representative TCP/IP data is transformed at the terminal 9 according to the TCP/IP protocol at 20 is transformed using the TCP/IP protocol to recover a representation of the message data.

It should be noted that there may be other layers in the protocol stack, and that the functions provided within the protocol stack may be divided differently between the layers that are present. For example, the protocol stack may include a layer 2 protocol which may or may not provide error checking functions; header compression functions could be provided by a layer 2 protocol, if present; division of data into frames could happen at the layer 2 stage. TCP may represent a layer 3 protocol and IP a layer 4 protocol.

The error check information in the headers of the TCP/IP packets can be used to check whether each TCP/IP packet has been received correctly at the terminal 9. If an error is detected (which would probably have arisen at step 4) then the terminal 9 can request retransmission of individual packets. In this way the message data can be recreated accurately at the terminal 9. If conventional TCP/IP header compression is used then when the probability of error on the radio link at step 4 is low there may be a saving in bandwidth. However, if the probability of error is high then the overhead due to retransmission of packets is likely to outweigh the saving from transmitting shorter headers.

The system of FIG. 1 includes a link 10 from the layer 1 apparatus 21 via the control processor 24 of terminal 4 to the TCP/IP apparatus 20. Using this link the information known to the layer 1 apparatus on the quality of the radio link between terminal 4 and the base station 2 can be communicated to the TCP/IP apparatus. Using the methods described below the TCP/IP apparatus can then adapt the format of the TCP/IP packets it generates, and in particular the level of header compression, in dependence on the quality of the link. The TCP/IP apparatus may receive the link quality information and/or additional link quality information from another source—for instance an additional unit in the terminal 4 that estimates link quality. The quality estimation, e.g. an error rate, could be obtained directly from the radio network subsystem (in a cellular implementation) or by directly monitoring the error rate for the compressed headers or their packets.

The decision of the TCP/IP unit 20 on the level of header compression to be used could be based on one or more of any available measures of link quality, such as SIR, an error rate (e.g. bit error rate, byte error rate, header error rate, packet error rate), requested transmit power, estimated path loss, estimated delay over the path. The measures used are preferably measures of the quality of the link in the direction in which the data generated by the TCP/IP unit is to be sent, but in many situations measures of the quality of the link in the opposite direction will be to some extent representative of link quality in the transmission direction and could therefore be used too or instead. Where more than one measure is used then an algorithm to effectively combine the used measures could be employed. Other factors may also be taken into account in deciding on the level of header compression—for instance user-generated information for controlling the desired header compression performance, or information from the network on traffic intensity. By using this information during the course of a connection and/or during the transmission of a message the level of header compression can be dynamically adjusted to suit the level of header compression to the probability of error.

The TCP/IP unit 20 includes apparatus (in dedicated hardware or in software) for executing an algorithm to control the generation of TCP/IP packets taking into account one or more measures of link quality. If the probability of error is higher then increased amounts of header information can be sent; if the probability of error is lower then reduced amounts of header information can be sent. The variation in the amount of header information may be achieved by dynamically adjusting the length of headers from between successive packets.

Figure 3A:
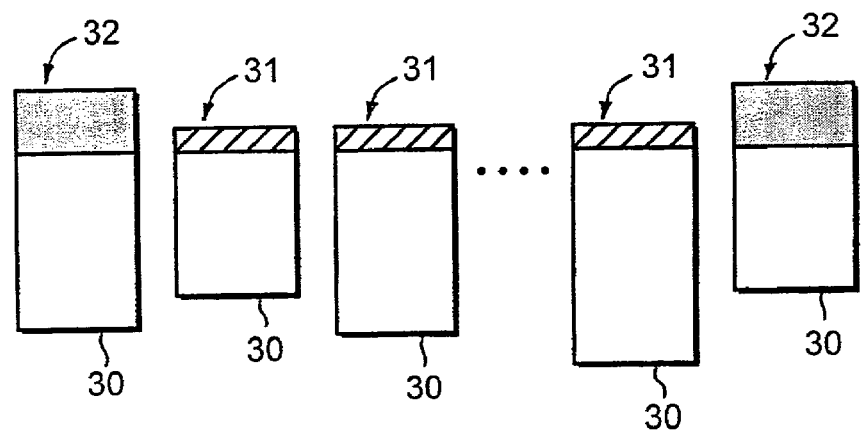
FIG. 3 shows the structure of data packets.
Figure 3B:
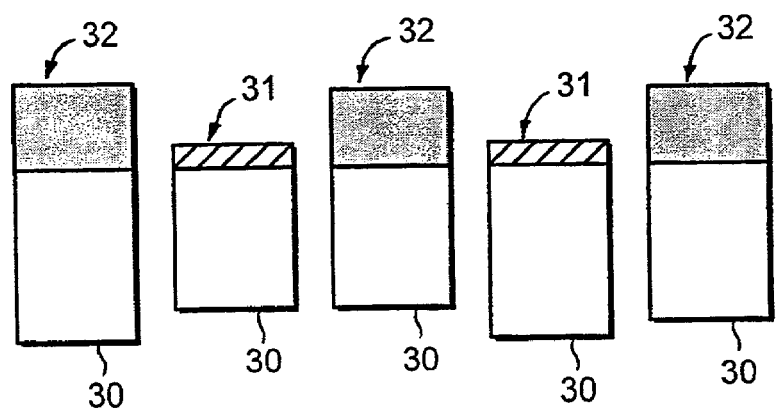

Some strategies for adjusting header lengths will now be described. One possibility is to adjust the frequency with which full headers or compressed headers are sent in dependence on the estimated link quality. Instead of the predefined exponentially growing interval of the prior art, the interval (i.e. the number of packets sent with compressed headers) between packets with full headers could vary depending on the estimated link quality, from zero or one upwards, optionally to a predefined upper limit. If every second header is sent uncompressed (equivalent to an interval of one) the connection still benefits somewhat from the header compression but an error in a header will at most affect only the next compressed header. There could be no upper limit on the interval—if the link were of excellent quality—so the interval could be anything between infinity (never sending uncompressed headers) and zero (always sending uncompressed headers). FIGS. 3a and 3b show two different situations, with reference numeral 30 denoting a packet, reference numeral 31 denoting a compressed header and reference numeral 32 denoting an uncompressed header. FIG. 3a shows a situation of high link quality. FIG. 3b shows a situation of low link quality.

The uncompressed header interval can be either one value common for all communications over a link or different for different channels or connections (e.g. TCP connections) over a link. The value could be the same or different for the two directions over a link. The decision on an uncompressed header interval could be made by both terminating TCP units or by just one (preferably the one that is solely or principally transmitting data that will be affected by the decision).

In cellular systems the variable interval header compression may be implemented between a mobile station and the corresponding node in the network (e.g. in the GPRS at the SGSN).

Figure 3C:
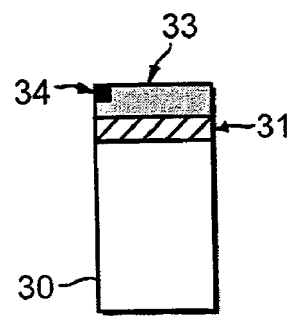

It may also be advantageous to implement header error correction (HEC) over the TCP link, whereby bits are transmitted so that errors in a header itself can be detected and/or corrected, with a probability of detection or correction depending on the number of HEC bits that are used relative to the size of the header. If a packet's header is not received correctly then that whole packet may have to be discarded and/or retransmitted. If a means of header error correction were available then it may be possible to correct the header and thereby avoid the need to discard or retransmit the packet. Relatively few HEC bits are needed to give a good probability of correcting errors in a compressed header. Therefore, it may be found efficient to use an additional error correction code covering compressed headers so that as many header bit errors as possible can be corrected. Depending on the size of the compressed header and the environment's BER the size (number of bits) of the HEC field may usefully be adjustable in order to keep the error correction as optimal as possible. This can be achieved by using potentially reserved bits of a packet (preferably the packet's first bits) to convey the size of the HEC field. The extra HEC bits themselves will add some length to the compressed header and it is thus feasible to keep the HEC relatively small. On the other hand it is advantageous to arrange that the header can be corrected in case of an error. FIG. 3c illustrates a packet 30 with compressed header 31 and a HEC field 33, the bits 34 indicating the HEC field length. It is preferred that the HEC field length should be dynamically changeable and adaptive to the quality of the connection. The HEC size could vary between no HEC at all to a predefined upper limit. The HEC size could be either one value common for all communications over a link or different for different channels or connections (e.g. TCP connections) over a link. The size could be the same or different for the two directions over a link.

The methods described above may be applied to other protocols than TCP. In general, they may be overlain on to any protocol that involves the transmission of discrete amounts of data (e.g. packets or other datagrams), of fixed or variable lengths, provided the provision of the features described above does not conflict technically essential features of the protocol. Examples of other protocols on to which it could be overlain include UDP/IP and RTP/UDP/IP.

The methods described above may be applied to a variety of communications systems, including cellular, satellite and ground-based links.

The present invention is not limited to the examples described above. The applicant draws attention to the fact that the present invention may include any feature or combination of features disclosed herein either implicitly or explicitly or any generalisation thereof, without limitation to the scope of any of the present claims. In view of the foregoing description it will be evident to a person skilled in the art that various modifications may be made within the scope of the invention.

The invention claimed is:

1. A method for communicating a message over a data path, the method comprising:
   forming a plurality of individual data segments together representing the message, each data segment having control data;
   estimating a quality of the data path;
   calculating, based on the estimated quality, an interval between data segments that are to be communicated over the data path in a first segment format that includes a first amount of control data, the interval decreasing when the estimated quality decreases;
   for each data segment, if the calculated interval has passed, selecting the first segment format, and otherwise selecting a second segment format, the second segment format including a second amount of control data, the second amount being less than the first amount; and
   transferring the data segments over the data path.

2. A method as claimed in claim 1, wherein the interval is a number of data segments between zero and infinity.

3. A method as claimed in claim 1, wherein the data segments are packets.

4. A method as claimed in claim 3, wherein the control data is comprised in a header and/or trailer of each packet.

5. A method as claimed in claim 4, wherein the first format is a format having a non-compressed header and the second format is a format having a compressed header.

6. A method as claimed in claim 1, wherein the quality of the data path is estimated by means of one or more of the following measures: signal to interference ratio, bit error rate, power loss over the data path, required transmission power over the data path, delay over the data path.

7. A method as claimed in claim 1, wherein the data path includes a portion over which no bit error correction protocol is applied.

8. A method as claimed in claim 1, wherein the data path includes a portion constituted by a radio link.

9. A method as claimed in claim 1, wherein the data segments are formed and transferred according to one or more of the following protocols: TCP, IP, UDP, RTP.

10. A method as claimed in claim 1, wherein each packet includes message data representing at least part of the message.

11. A method as claimed in claim 10, wherein the available segment formats do not differ in their ability to comprise message data.

12. A method as claimed in claim 10, wherein the control data of each segment includes first control data for permitting control of the transmission and/or reception of the segment and second control data for permitting detection and/or correction of errors in the first control data.

13. A method as claimed in claim 12, wherein the available segment formats including greater amounts of first control data include greater amounts of second control data.

14. A communication system for communicating a message over a data path, comprising:

data forming apparatus configured to form a plurality of individual data segments together representing the message, each data segment having control data;

path quality estimation apparatus configured to estimate a quality of the data path;

segment format determining apparatus configured to calculate based on the estimated quality an interval between data segments that are to be communicated over the data path in a first segment format that includes a first amount of control data, the interval decreasing when the estimated quality decreases;

segment format selecting apparatus configured to select, for each data segment, the first segment format if the calculated interval has passed, and otherwise selecting a second segment format, the second segment format including a second amount of control data, the second amount being less than the first amount; and data transfer apparatus configured to transmit the data segments over the data path.

15. A communication system as claimed in claim 14, wherein the interval is a number of data segments between zero and infinity.

16. A communication system for communicating a message over a data path, comprising:

means for forming a plurality of individual data segments together representing the message, each data segment having control data;

means for estimating a quality of the data path;

means for calculating based on the estimated quality an interval between data segments that are to be communicated over the data path in a first segment format that includes a first amount of control data, the interval decreasing when the estimated quality decreases;

means for selecting for each data segment the first segment format if the calculated interval has passed, and otherwise selecting a second segment format, the second segment format including a second amount of control data, the second amount being less than the first amount; and means for transferring the data segments over the data path.

17. A transmission apparatus for transmitting a message over a data path, comprising:

means for forming a plurality of individual data segments together representing the message, each data segment having control data;

means for estimating of a quality of the data path;

means for calculating based on the estimated quality an interval between data segments that are to be communicated over the data path in a first segment format that includes a first amount of control data, the interval decreasing when the estimated quality decreases;

means for selecting for each data segment the first segment format if the calculated interval has passed, and otherwise selecting a second segment format, the second segment format including a second amount of control data, the second amount being less than the first amount; and means for transferring the data segments over the data path.

18. A transmission apparatus as claimed in claim 17, wherein the transmission apparatus is a mobile terminal.

19. A transmission apparatus as claimed in claim 17, wherein the transmission apparatus is a base station.

20. An apparatus for transmitting a message over a data path, comprising:

data forming apparatus configured to form a plurality of individual data segments together representing the message, each data segment having control data;

path quality estimation apparatus configured to estimate a quality of the data path;

segment format determining apparatus configured to calculate based on the estimated quality an interval between data segments that are to be communicated over the data path in a first segment format that includes a first amount of control data, the interval decreasing when the estimated quality decreases;

segment format selecting apparatus configured to select for each data segment, the first segment format if the calculated interval has passed selecting and otherwise selecting a second segment format, the second segment format including a second amount of control data, the second amount being less than the first amount; and data transfer apparatus configured to transmit the data segments over the data path.

* * * * *